Patented Sept. 23, 1947

2,427,760

UNITED STATES PATENT OFFICE 2,427,760

PROCESS FOR EXTRACTION OF SELECTIVE HORSE BEAN PROTEINS IN ACID MEDIA

Frederic A. Beique, Outremont, Quebec, Canada

No Drawing. Application March 22, 1944,
Serial No. 527,678

4 Claims. (Cl. 260—112)

This invention pertains to a new process for extraction of selective vegetable proteins in acid media. This process is particularly effective in the extraction of proteins from the horse bean, otherwise known as *Vicia faba*.

The known processes for extraction of proteins from horse bean are somewhat similar to the processes used in the extraction of proteins from soy bean, except for the oil extraction which is generally unnecessary in the case of horse bean.

A particular example of the known processes may be entitled as follows:

(a) Agitating horse bean powder for a half hour with 8 to 10 parts by weight of water containing 0.15% of acetic acid, pH thus standing at or near 5, most of the proteins being undispersed and most of the carbohydrates, mineral salts, etc., being dissolved;

(b) Centrifuging or filter-pressing the mixture thus obtained;

(c) Agitating the residual cake for one hour with 8 to 10 parts by weight of water containing such an amount of an alkaline reacting agent that brings the pH of the dispersion between 6 and 12, most of the proteins being thus dispersed;

(d) Centrifuging or filter-pressing the mixture thus obtained;

(e) Precipitating the proteins from this aqueous dispersion by adding such an amount of an acid reacting agent that brings the pH of the dispersion at or near 5, thus obtaining a substantially complete precipitation of the said proteins;

(f) Centrifuging or filter-pressing the mixture thus obtained;

(g) Driving off most of the water from these precipitated proteins by means of heat under reduced pressure and/or dissolving these proteins in suitable alkaline reacting agents in suitable concentrations and amounts, as, for an example, 100 c. c. of a 2% borax solution has been found satisfactory to dissolve 8 grams of dry proteins, or 35 grams of undried protein cake;

(h) Dispersion of proteins may also be effected in acid media, at a suitable pH such as 2;

(i) Precipitation is then obtained by adding such an amount of an alkaline reacting agent that brings the pH of the dispersion at or near 5;

(j) Final dissolution may also be effected in acid media, as, for an example, 100 c. c. of $$\frac{3N}{2}$$

HCl have been found satisfactory to dissolve 250 grams of centrifuged and undried proteins.

It is widely known that horse bean proteins and generally speaking, vegetable proteins obtained as explained above, can hardly compete with casein, particularly in the fields of plastics, glues, adhesives, textile and paper sizing and coatings, artificial wool, waterproof waterpaints, etc. This is due principally to the poor adhesive strength, viscosity, transparency and stability of the said vegetable proteins in aqueous solutions.

The process underlying this present invention greatly improves those physical properties. It consists essentially in an extraction of selective vegetable proteins in acid media.

I have discovered that vegetable proteins, and particularly horse bean proteins, when dispersed in acid media at a suitable pH, may be partially precipitated at a very definite pH (this partial precipitation being called selective precipitation), part of the proteins remaining in dispersion whilst the remainder precipitates together with denatured proteins and other organic compounds. These precipitated proteins are of poor quality. The proteins still remaining in dispersion (which are called selective proteins) may then be precipitated in a state of great purity at a suitable pH which is different from the first one, most of the impurities together with some denatured proteins having been precipitated by the first precipitation.

It has to be noted that to obtain the said selective precipitation of vegetable proteins the preliminary dispersion in acid media is to be preferred because an alkaline dispersion leads to proteins of a poorer quality.

I shall now describe an example of the process, with such detail as is necessary for a proper understanding thereof.

100 grams of air dried horse beans are first crushed, ground, and passed through a 60 mesh sieve, most of the hulls being blown by compressed air. 85 grams of horse bean powder are thus obtained. 680 c. c. of water containing 1 gram of glacial acetic acid are added to that powder and the whole mixture is agitated during one half hour, final pH standing at about 5. The mixture is then centrifuged in an ordinary laboratory centrifugal machine for 15 minutes, or it may be passed through a laboratory filter-press. The cake thus obtained is mixed and agitated for one hour with 680 c. c. of water containing 4 c. c. of commercial hydrochloric acid (36%), final pH standing at about 1.9. The resulting dispersion is then centrifuged or filter-pressed, and the cloudy solution thus obtained is subjected to a selective precipitation by the slow addition of a 5% trisodium phosphate solution until the final pH stands at about 3.8. A portion of the proteins is thus precipitated together with denatured proteins and various organic compounds. The mixture is again centrifugated or filter-pressed, and the resulting cloudy liquid contains the remainder of the proteins (which I designate as selective proteins) in a particular state of dispersion and in a very pure form. This liquid is precipitated by the slow addition of 5% trisodium phosphate solution until a pH of about 4.4 is reached. The selective proteins thus obtained are centrifuged or filter-pressed. The resulting cake of selective proteins contains about 90% of the total proteins obtained by means of the two successive precipitations. The yield of said selective proteins, in the undried state, is about 82 to 85 grams, containing about 14 to 20% of dry proteins. These 82 to 85 grams of undried proteins may be readily dissolved in about 30 c. c. of 1.8% HCl, the resulting solution showing great improvement in vegetable proteins obtained by previously known processes, particularly as regards transparency, adhesive strength, viscosity and stability.

The process embodied in this invention is susceptible of a number of variations depending upon the use of various dispersion and/or precipitation and/or final dissolution agents, as well as the concentration of said chemical compounds.

For instance, acids other than hydrochloric may be used, such as oxalic acid and phosphoric acid, the amount of such acids to be determined by their molecular ratio to hydrochloric acid.

Again, precipitation agents other than trisodium phosphate may be used, such as pyridine, sodium carbonate, di-ammonium acid phosphate, calcium hydroxide, or sodium hydroxide.

Instead of using 8 to 10 parts of water for dispersion, it may sometimes be useful to operate with other dilutions such as 15 to 20 parts of water to take care of special conditions encountered in the course of operations, particularly when the process of decantation is used instead of centrifuging or filter-pressing; and if such process of decantation is used, it is in some cases more useful to make two dispersions instead of one, the results being greatly improved. A mixture of acids may be used instead of any specific acid.

The solution of precipitated proteins may be concentrated by means of distillation or evaporation of part of the water, specially under reduced pressure. This mode of operation is not advisable when working with non-selective proteins or in alkaline media.

Although this process may be applied to most of the vegetable proteins, it is specially advantageous when using horse beans.

The pH of dispersion may be varied between approximately 1 and 3, the pH of selective precipitation being affected accordingly. For example, when the pH of dispersion is approximately 1.9, a good pH of selective precipitation is found at approximately 3.8 when using a 5% trisodium phosphate solution, and final complete precipitation may be obtained at approximately 4.4. If, on the other hand, the pH of dispersion is in the neighborhood of 1.2, the pH of selective precipitation seems to be a higher hydrogen ion concentration to produce similar results.

For a definite pH of dispersion, such as 1.8, the pH of selective precipitation may vary from about 3.7 to 4.1, depending upon the required quality and yield of selective proteins. For example, the pH of selective precipitation being 4.1 and the pH of final precipitation being at 4.4, the final yield of selective proteins will be approximately 26%. Again, the pH of selective precipitation being 3.7 and the pH of final precipitation being 4.3, the final yield of selective proteins will be approximately 94%. It should also be noted that there occur some variations in the pH depending on the precipitating agent used.

Precipitation of the selective proteins may be obtained at a pH between about 4.2 and 6.5; however, pH between 4.3 and 5.0 is preferred.

Of course, the amount of water contained in the solid cake of proteins depends upon the centrifugal force used.

It is well known that an acid dispersion followed by a suitable precipitation and a final dissolution in acid media, particularly when using a volatile acid such as hydrochloric acid, leads to a film forming solution. The film thus obtained may be rendered substantially waterproof either by evaporation of the volatile acid or by addition of aqueous formaldehyde followed by evaporation. When using non-volatile acids such as oxalic acid, it is advisable to use both formaldehyde and lime water.

I have also found that the waterproofing of this said film is greatly improved by using selective proteins. Decantation may also be used instead of centrifuging or filter-pressing. When processing in such a way a greater amount of dispersing agent may be used, from the practical viewpoint.

Again, I have also found that the waterproofing of the film may be greatly improved when using these selective proteins if the undried cake of precipitated proteins is washed with water at or near the pH of 5, most of the water-soluble products being thus eliminated. The invention is not limited to the illustrations described herein and is susceptible of such modifications as have been indicated.

What I claim as my invention is:

1. A process for extraction of horse bean proteins by selective precipitation from their aqueous dispersion in acid media, consisting in agitating 1 part horse bean powder for one hour with 8 parts by weight of water containing 0.02 part of HCl, the pH being about 1.8 at room temperature; adding to the dispersion thus obtained such an amount of trisodium phosphate that brings the pH of the dispersion to about 3.8 thereby precipitating one fraction of proteins; separating the said first fraction of the proteins which has been precipitated at that pH from the cloudy liquid that still retains the other part of the proteins; adding to said cloudy liquid such an amount of trisodium phosphate that brings the pH of the dispersion to about 4.4 thereby precipitating a second and aqueous fraction of proteins; separating said second fraction of proteins from the liquid; rendering the said second fraction of proteins substantially waterproof by dissolution in hydrochloric acid, adding formaldehyde and driving off the water contained in said dissolution together with hydrochloric acid and formaldehyde.

2. A process for extraction of horse bean proteins by selective precipitation from their aqueous dispersion in acid media, consisting in agitating 1 part horse bean powder for one half hour with 8 parts by weight of water containing 0.012 part of acetic acid, the pH of the solution being about 5, and most of the carbohydrates and mineral salts being dissolved; centrifuging the mixture thus obtained and collecting the solid product obtained by centrifuging; agitating said solid product for one hour with 8 parts by weight of water containing 0.02 part of HCl, the pH of the dispersion being about 1.8; centrifuging the mixture thus obtained and collecting the liquid obtained by centrifuging; adding to that liquid such an amount of trisodium phosphate that brings the pH of that liquid to about 3.8 thereby precipitating one fraction of proteins; centrifuging the mixture, thus separating the said first fraction of the proteins that has been precipitated at the pH from the cloudy liquid that still retains the remainder of the proteins; adding to said cloudy liquid such an amount of trisodium phosphate that brings the pH of that liquid to about 4.4 thereby precipitating a second and aqueous fraction of proteins; centrifuging and collecting the said second fraction of the proteins thus obtained in the form of a solid cake; rendering the said second fraction of proteins substantially waterproof by dissolution in hydrochloric acid, adding formaldehyde and driving off the water contained in said dissolution together with hydrochloric acid and formaldehyde.

3. A process for extraction of horse bean proteins by selective precipitation from their aqueous dispersion in acid media, consisting in agitating horse bean powder for one half hour with 8 parts by weight of water containing 0.012 part of acetic acid, the pH of the solution being about 5, and most of the carbohydrates and mineral salts being dissolved; allowing the solution to settle; decanting the semi-solid product thus obtained and collecting it; agitating said semi-solid product for one hour with 8 parts by weight of water containing 0.02 part of HCl, the pH of the dispersion being at about 1.8 at room temperature; allowing the dispersion to settle; decanting and collecting the liquid thus obtained; adding to said liquid an amount of trisodium phosphate that brings the pH of that liquid to about 3.8 thereby precipitating one fraction of proteins; allowing the mixture to settle, thus separating the said first fraction of the proteins that has been precipitated at that pH from the cloudy liquid that still retains the remainder of the proteins; adding to said cloudy liquid such an amount of trisodium phosphate that brings the pH of that liquid to about 4.4 thereby precipitating a second and aqueous fraction of proteins; allowing the liquid to settle; decanting and collecting the said second fraction of proteins thus obtained; rendering the said second fraction of proteins substantially waterproof by dissolution in hydrochloric acid, adding formaldehyde and driving off the water contained in said dissolution together with hydrochloric acid and formaldehyde.

4. A process for extraction of horse bean proteins by selective precipitation from their aqueous dispersion in acid media, consisting in dispersing horse bean proteins in water containing such an amount of an acid reacting agent that brings the pH of the dispersion between 1 and 3; adding to the dispersion thus obtained such an amount of a reacting agent that brings the pH of the dispersion between 3.7 and 4.1 thereby precipitating one fraction of proteins; separating said first fraction of proteins which has been precipitated at that pH from the cloudy liquid that still retains the remainder of the proteins; adding to said cloudy liquid such an amount of a reacting agent that brings the pH of the dispersion between 4.3 and 6.5 thereby precipitating a second and aqueous fraction of proteins; separating the said second fraction of proteins from the liquid; rendering the said second fraction of proteins substantially waterproof by dissolution in hydrochloric acid, adding formaldehyde and driving off the water contained in said dissolution together with hydrochloric acid and formaldehyde.

FREDERIC A. BEIQUE.

REFERENCES CITED

The following references are of record in the file of this patent:

UNITED STATES PATENTS

| Number | Name | Date |
|---|---|---|
| 2,260,640 | Rawling et al. | Oct. 28, 1941 |
| 2,331,619 | Morse | Oct. 12, 1943 |

FOREIGN PATENTS

| Number | Country | Date |
|---|---|---|
| 124,371 | Germany | Oct. 9, 1901 |

OTHER REFERENCES

Cohn, Chemical Reviews, vol. 28 (1941), pp. 395–417.

Cohn et al., Journ. Am. Chem. Soc., vol. 62, pp. 3386–3400.